Nov. 9, 1948.   R. T. REARDON   2,453,539
DYNAMOELECTRIC MACHINE CORE SURFACE TREATMENT
Filed Nov. 6, 1944

Inventor:
Robert T. Reardon,
by *Harry E. Dunham*
His Attorney.

Patented Nov. 9, 1948

2,453,539

UNITED STATES PATENT OFFICE 2,453,539

DYNAMOELECTRIC MACHINE CORE SURFACE TREATMENT

Robert T. Reardon, Fort Wayne, Ind., assignor to General Electric Company, a corporation of New York Application November 6, 1944, Serial No. 562,120

10 Claims. (Cl. 171—252)

My invention relates to dynamoelectric machines and particularly to an improved core structure for such machines and method of making the same for reducing the high frequency losses therein.

An object of my invention is to provide an improved dynamoelectric machine having a core of magnetic material.

Another object of my invention is to provide an improved dynamoelectric machine having two relatively rotatable cores of magnetic material with a case surface treatment for the adjacent surfaces of said cores for reducing the high frequency losses therein.

A further object of my invention is to provide an improved method of making a core of magnetic material for a dynamoelectric machine.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
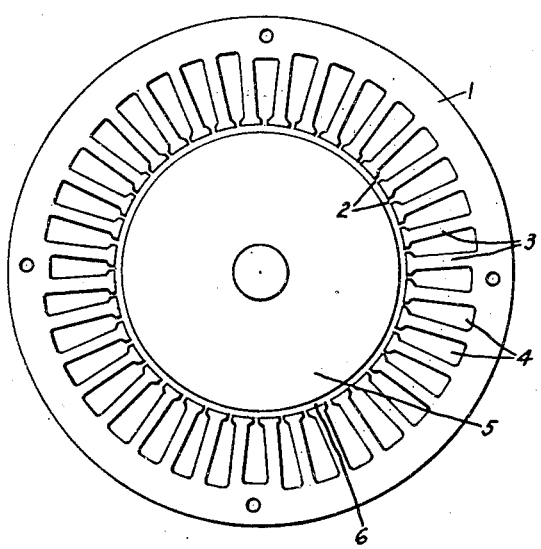
Figure 2:
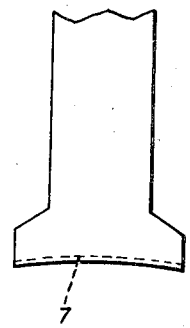
Figure 3:
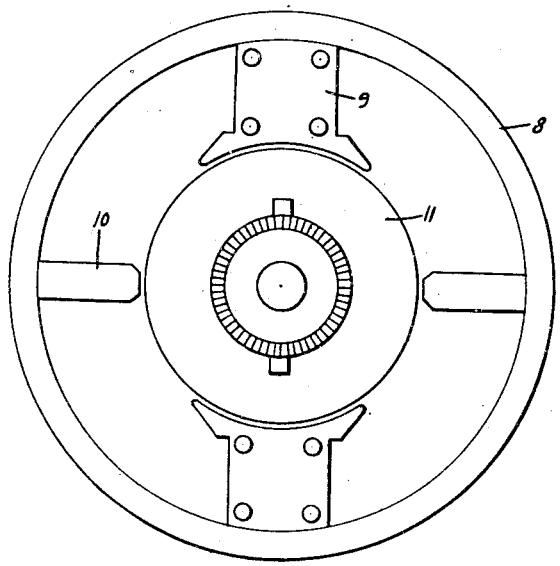
Figure 4:
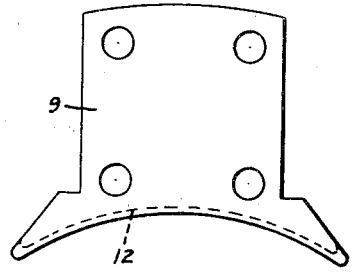

In the drawing, Fig. 1 is an end elevational view of the core of the stator of a dynamoelectric machine provided with an embodiment of my invention; Fig. 2 is an enlarged view of the end of one of the teeth of the core shown in Fig. 1; Fig. 3 is an end elevational view of a dynamoelectric machine provided with another embodiment of my invention; and Fig. 4 is an enlarged view of one of the main pole pieces of the machine shown in Fig. 3.

Referring to the drawing, I have shown in Figs. 1 and 2 an embodiment of my invention as applied to a toothed stator core 1 of a dynamoelectric machine. This core is formed of a plurality of laminations of the conventional type made of magnetic material, such as iron or steel, having a relatively low or negligible silicon content. In this machine, the air gap 2 formed between the adjacent ends of the teeth 3 is adapted to be closed by a non-magnetic member when a winding is placed in the slots 4 between the teeth in order to provide magnetically open slots between adjacent teeth. With such an arrangement, relatively large high frequency losses are induced in the other relatively rotatable member 5 which is formed with a core of magnetic material and arranged to provide an air gap 6 between the two relatively rotatable member cores. In order to reduce the high frequency losses in the core of the member 5 and in the faces of the teeth 3 of the member 1, I case impregnate the adjacent surfaces of these two members with silicon to from 6 to 20%, and preferably about substantially 6%, to a depth of between 0.001 and 0.06 inch, as indicated by the dotted line 7 in Fig. 2. This impregnation of the cores should be done with the laminations assembled and clamped together and may be performed in any suitable manner, such as that described in Patent 2,109,485, Ihrig. This impregnation of the air gap surfaces of the two relatively rotatable cores increases the resistivity of these surfaces and thereby greatly reduces the eddy current losses induced therein. In order to obtain the desired penetration and to obtain the proper diffusion of the silicon in the magnetic material, I have found it desirable to anneal the assembled cores after the impregnation in order to provide the desirable characteristics to the material. Preferably, this annealing is performed at a temperature between 650° C. and 1300° C. for from 4 to 10 hours in a non-oxidizing atmosphere, which might comprise a reducing gas such as hydrogen, or some substantially inert gas such as argon, performed subsequent to the case impregnation of the core.

The result of the impregnation process is a case or surface layer on the core having a high percentage of silicon relative to the total percentage in the core. This produces a high resistivity case which is effective for the reduction of eddy current losses, however, the forming of this high silicon content case also results in higher magnetic reluctance. This higher reluctance is accompanied with poor permeability, high hysteresis loses, and materially increases the effective air gap between the stationary and rotating member. The annealing operation is performed after the impregnation process is completed in order to cause the silicon from the silicon rich surface to diffuse into the low silicon core. This decreases the magnetic reluctance of the case thereby reducing the effective air gap, improving the permeability and reducing hysteresis losses. It is believed that the carbon present in the steel gives a further high reluctance path and that during the high temperature annealing operation, the steel is decarburized giving further magnetic improvement.

The resulting silicon content of the case after annealing or depth of penetration into the core, depends on the temperature, furnace atmosphere, and time during which the parts are held at the temperature during the annealing operation. In addition to the diffusion of the silicon into the lower silicon core from the rich silicon surface, it is believed that there may be a structural and chemical change at the silicon-rich surface and in addition, some silicon will be driven off to the inert gas used in the annealing process.

In certain instances where the laminations may be held together under a relatively high pressure, either by clamping or by riveting, it may not be necessary to perform the annealing in a non-oxidizing atmosphere. However, this is definitely advantageous in a case where the laminations are not held together under a sufficiently high pressure to prevent excessive oxidation of the surfaces of the laminations and of the core. In addition to providing the desired diffusion of the silicon, this annealing also removes punching stresses which may have occurred during the fabrication of the laminations and the punching of the slots therein.

In Figs. 3 and 4, I have shown another embodiment of my invention in which a dynamoelectric machine is provided with a relatively stationary magnet frame 8 provided with main pole pieces 9 and commutating pole pieces 10. These pole pieces are adapted to be magnetically excited in any conventional manner with suitable windings, as permanent magnets, and a second relatively rotatable member 11, such as an armature having a core of magnetic material, is arranged to react electrodynamically with the stationary member. The core of the armature 11 is spaced from the pole pieces 9 and 10 to provide an air gap therebetween, as in a conventional machine of this type, and the surfaces of the pole pieces adjacent the air gap, as well as the surface of the core of the rotatable member 11 adjacent the pole faces, is case impregnated with silicon and subsequently annealed to provide the same characteristics as described with respect to the construction shown in Figs. 1 and 2. This case impregnation is indicated by the dotted line 12 in Fig. 4. In this type machine, it may be found that it is not necessary to case impregnate the core of the rotatable member 11, as the salient pole pieces are relatively few and will not tend to induce such high losses in the core of the member 11 as with a toothed stationary member, such as that shown in Fig. 1. Since the armature 11 generally is formed with a winding arranged in a plurality of winding slots in the core, relatively large high frequency losses will be induced in the faces of the pole pieces, and it is desirable, therefore, that these faces should be impregnated to provide my improved core for these parts of the dynamoelectric machine. The percentage of silicon in the case impregnation may be varied according to the type of machine, but I have found that 8 to 12% of silicon provides the most desirable range. However, a noted improvement can be found when this case impregnation contains 6 to 7% silicon.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A dynamoelectric machine member having a core of magnetic material, said core having a case impregnation of the air gap surface thereof of 6 to 20% silicon to a depth of between 0.001 to 0.06 inch and having properties characteristic of such material, said core being annealed at between 650° C. and 1300° C. for from 4 to 10 hours subsequent to said case impregnation providing diffusion of the silicon in said core whereby the magnetic reluctance of said core is reduced improving permeability and reducing hysteresis losses.

2. A dynamoelectric machine having a member with a core of magnetic material, a second relatively rotatable member with a core of magnetic material having a surface thereof arranged adjacent said first-mentioned core with an air gap therebetween, said cores having a case impregnation of the adjacent surfaces thereof of 6 to 20% silicon and having properties characteristic of such material, said cores being annealed at between 650° C. and 1300° C. for from 4 to 10 hours subsequent to said case impregnation providing diffusion of the silicon into said cores whereby the magnetic reluctance is reduced improving permeability and reducing hysteresis.

3. A dynamoelectric machine having a member with a core of magnetic material, a second relatively rotatable member with a core of magnetic material having a surface thereof arranged adjacent said first-mentioned core with an air gap therebetween, said cores having a case impregnation of the adjacent surfaces thereof of 6 to 20% silicon to a depth of between 0.001 to 0.06 inch and having properties characteristic of such material, said core being annealed at between 650° C. and 1300° C. subsequent to said case impregnation providing diffusion of the silicon in said cores whereby the magnetic reluctance is reduced improving permeability and reducing hysteresis.

4. A dynamoelectric machine having a member with a core of magnetic material, a second relatively rotatable member with a core of magnetic material having a surface thereof arranged adjacent said first-mentioned core with an air gap therebetween, said cores having a case impregnation of the adjacent surfaces thereof of 6 to 20% silicon and having properties characteristic of such material, said core being annealed in a non-oxidizing atmosphere at between 650° C. and 1300° C. for from 4 to 10 hours subsequent to said case impregnation providing diffusion of the silicon in said cores whereby the magnetic reluctance is reduced improving permeability and reducing hysteresis.

5. A dynamoelectric machine having a member with a core of magnetic material having magnetically open slots therein, a second relatively rotatable member with a core of magnetic material having a surface thereof arranged adjacent said first-mentioned core with an air gap therebetween, said cores having a case impregnation of the adjacent surfaces thereof of 6 to 20% silicon to a depth of between 0.001 to 0.06 inch and having properties characteristic of such material, said cores being annealed at between 650° C. and 1300° C. in a non-oxidizing atmosphere subsequent to said case impregnation providing diffusion of the silicon in said cores whereby the magnetic reluctance is reduced improving permeability and reducing hysteresis losses.

6. A dynamoelectric machine having a member with a core of magnetic material, a second relatively rotatable member with a core of magnetic material having a surface thereof arranged adjacent said first-mentioned core with an air gap therebetween, said cores having a case impregnation of the adjacent surfaces thereof of substantially 6% silicon at the surface of said case and having properties characteristic of such material, said cores being annealed at between 650° C. and 1300° C. for from 4 to 10 hours subsequent to said case impregnation for providing diffusion of the silicon in said cores whereby the magnetic reluctance is reduced improving permeability and reducing hysteresis.

7. The method of treating a core of magnetic material for a dynamoelectric machine comprising the case impregnation of the air gap surface thereof with 6 to 20% silicon to a depth of between 0.001 to 0.06 inch and annealing the core at between 650° C. and 1300° C. for from 4 to 10 hours subsequent to said case impregnation providing diffusion of the silicon in the core whereby the magnetic reluctance is reduced improving permeability and reducing hysteresis losses.

8. The method of treating a core of magnetic material for a dynamoelectric machine comprising the case impregnation of the air gap surface with 6 to 20% silicon and annealing the core at between 650° C. and 1300° C. for from 4 to 10 hours in a non-oxidizing atmosphere subsequent to said case impregnation providing diffusion of the silicon in the core whereby the magnetic reluctance is reduced improving permeability and reducing hysteresis losses.

9. The method of treating a core of magnetic material for a dynamoelectric machine comprising the case impregnation of the air gap surface thereof of substantially 6% silicon to a depth of between 0.001 to 0.06 inch and annealing the core at between 650° C. and 1300° C. for from 4 to 10 hours in a non-oxidizing atmosphere subsequent to said case impregnation providing diffusion of the silicon in the core whereby the magnetic reluctance is reduced improving permeability and reducing hysteresis losses.

10. A dynamoelectric machine having a member with a core of magnetic material, a second relatively rotatable member with a core of magnetic material having a surface thereof arranged adjacent said first mentioned core with an air gap therebetween, said cores having a case impregnation of the adjacent surfaces thereof of substantially 6% silicon, the surface of said case to a depth between 0.001 to 0.06, said core being annealed at between 650° C. and 1300° C. for from 4 to 10 hours in a non-oxidizing atmosphere subsequent to said case impregnation providing diffusion of the silicon in said cores whereby the magnetic reluctance is reduced improving permeability and reducing hysteresis losses.

ROBERT T. REARDON.

REFERENCES CITED

The following references are of record in the file of this patent:

UNITED STATES PATENTS

| Number | Name | Date |
| --- | --- | --- |
| 860,979 | King | July 23, 1907 |
| 1,919,806 | Schulz | July 25, 1933 |
| 2,109,485 | Ihrig | Mar. 1, 1938 |